United States Patent
Chen et al.

(10) Patent No.: US 12,461,211 B2
(45) Date of Patent: Nov. 4, 2025

(54) APPARATUSES FOR DETECTING DISTANCE AND METHODS THEREOF

(71) Applicants: Sintai Optical (Shenzhen) Co., Ltd., Guandong (CN); Asia Optical Co., Inc., Taichung (TW)

(72) Inventors: Chia-Heng Chen, Taichung (TW); Ming-Sheng Chi, Taichung (TW); Chih-Wei Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 982 days.

(21) Appl. No.: 17/562,058

(22) Filed: Dec. 27, 2021

(65) Prior Publication Data
US 2022/0236389 A1  Jul. 28, 2022

(30) Foreign Application Priority Data
Jan. 25, 2021 (CN) .......................... 202110093331.4

(51) Int. Cl.
*G01S 17/08* (2006.01)
*G01S 7/497* (2006.01)

(52) U.S. Cl.
CPC .............. *G01S 7/497* (2013.01); *G01S 17/08* (2013.01)

(58) Field of Classification Search
CPC ................................ G01S 7/497; G01S 17/08
See application file for complete search history.

(56) References Cited

U.S. PATENT DOCUMENTS

| 6,292,256 B1 * | 9/2001 | Yoshida ................... G02B 7/32 356/3.04 |
| 10,534,075 B2 * | 1/2020 | Matsumoto .......... G01C 15/002 |
| 2002/0190895 A1 * | 12/2002 | Nakanishi ............... G01S 13/42 342/146 |

FOREIGN PATENT DOCUMENTS

| CN | 210923946 U | 7/2020 |
| KR | 101663976 B1 | 10/2016 |
| TW | 175515 | 12/1991 |
| TW | 550376 B | 9/2003 |

* cited by examiner

*Primary Examiner* — Elias Desta
(74) *Attorney, Agent, or Firm* — McClure, Qualey & Rodack, LLP

(57) ABSTRACT

Apparatuses for detecting distance and methods thereof are provided. First, a first distance measurement mode and a second distance measurement mode can be executed by using an apparatus having a distance measurement capability, and the apparatus has an anti-vibration module. When the first distance measurement mode is executed, the anti-vibration module is electrically connected to perform distance measurement, and a first distance measurement result is obtained, wherein the maximum movement compensation amount of the anti-vibration module is a first value. When the second distance measurement mode is executed, the anti-vibration module is electrically connected to perform distance measurement, and a second distance measurement result is obtained, wherein the maximum movement compensation amount of the anti-vibration module is a second value, and the first value is greater than the second value.

18 Claims, 8 Drawing Sheets

APPARATUSES FOR DETECTING DISTANCE AND METHODS THEREOF

BACKGROUND OF THE INVENTION

Field of the Invention

The disclosure relates generally to apparatuses for detecting distance and methods thereof, and, more particularly to methods and apparatuses for distance detection in an apparatus having a distance measurement capability and an anti-vibration function.

Description of the Related Art

Recently, laser rangefinders have replaced traditional ranging methods to become the mainstream of ranging systems. The laser rangefinder can emit laser pulses to the target object to be ranged and start timing, and stop timing when it receives reflected light. The period of time can be converted into the distance between the laser and the target object. Due to the unique principle of the laser, even if the measurement target is inconvenient to approach, it can be measured through the instrument.

Since a measurer can hold the laser rangefinder to measure the distance, the slight jitter of the measurer may affect the accuracy of the measurement. Therefore, the optical anti-vibration technology is applied to laser rangefinders to reduce the adverse effects of vibration on the measurement results. The principle of optical anti-vibration is to use the built-in lens or photosensitive element to reversely correct the horizontal or up and down movement of the rangefinder.

For example, a laser rangefinder with optical anti-vibration function can be used in general distance measurement situations, and the optical anti-vibration function can solve the situation of deviation of the laser beams due to the user's involuntary hand-held vibration or involuntary pressing of the ranging button. Especially when the target is a small, and which is not easy to hit, such as in the case of aiming at a golf flagpole, the user usually habitually moves the rangefinder in a large range back and forth to scan and search for the position of the flagpole. Since the acceleration value of the sensor, such as Gyro sensor or G-Sensor, is 0 when moving at a constant speed, the optical anti-vibration function will stagnate, making the hit rate on the flagpole of the rangefinder has dropped significantly, and the reverse correction of the optical anti-vibration function has caused the opposite effect. FIG. 1 shows the signal results 100 obtained by the laser rangefinder when the rangefinder moves left and right back and forth. The ordinate of FIG. 1 is the voltage value (V), and the abscissa of FIG. 1 is time (T). The greater the amplitude of the voltage value (V), the greater the amount of movement compensation of the optical anti-vibration. As shown in the figure, the vertical movement signal 110 and the horizontal movement signal 120 are deviated from their respective vertical center 112 and horizontal center 122.

BRIEF SUMMARY OF THE INVENTION

In an embodiment of a method for detecting distance for use in an apparatus having a distance measurement capability. First, a first distance measurement mode and a second distance measurement mode can be executed by using the apparatus, and the apparatus has an anti-vibration module. When the first distance measurement mode is executed, the anti-vibration module is electrically connected to perform distance measurement, and a first distance measurement result is obtained, wherein the maximum movement compensation amount of the anti-vibration module is a first value. When the second distance measurement mode is executed, the anti-vibration module is electrically connected to perform distance measurement, and a second distance measurement result is obtained, wherein the maximum movement compensation amount of the anti-vibration module is a second value, and the first value is greater than the second value.

In some embodiments, when the first distance measurement mode is executed, the apparatus electrically connects the anti-vibration module to perform a movement compensation calculation according to a first displacement amount of the apparatus, so that the anti-vibration module has the first maximum movement compensation amount, and obtains the first distance measurement result. When the second distance measurement mode is executed, the rangefinder electrically connects the anti-vibration module to perform the movement compensation calculation according to a second displacement amount of the apparatus, so that the anti-vibration module has the second maximum movement compensation amount.

In some embodiments, the apparatus obtains candidate distances corresponding to a plurality of candidate target objects. One of the candidate distances is selected as the second distance measurement result.

In some embodiments, a mode switch module for switching between the first distance measurement mode and the second distance measurement mode is provided.

In some embodiments, when the second distance measurement mode is executed, a processor electrically connects the anti-vibration module, and the apparatus moves a second displacement amount to perform the movement compensation calculation, so that the anti-vibration module has the second maximum movement compensation amount.

In some embodiments, the apparatus obtains candidate distances corresponding to a plurality of candidate target objects. The mode switch module further sets to select one of the candidate distances as the second distance measurement result.

In some embodiments, it is determined whether the apparatus enters the second distance measurement mode. When the apparatus enters the second distance measurement mode, the anti-vibration module is electrically connected in the second distance measurement mode, and performs a movement compensation based on the second maximum movement compensation amount.

In some embodiments, the second maximum movement compensation amount is close to zero.

In some embodiments, it is determined whether a displacement amount of the apparatus is greater than a preset value, thus to determine whether to execute the first distance measurement mode or the second distance measurement mode. When the displacement amount of the apparatus is not greater than the preset value, the first distance measurement mode is determined to be executed. When the displacement amount of the apparatus is greater than the preset value, the second distance measurement mode is determined to be executed.

An embodiment of an apparatus having a distance measurement capability comprises a distance measurement unit and an anti-vibration module. The distance measurement unit comprises at least a transmitting module and a receiving module, wherein the transmitting module emits a measuring beam, and the measuring beam is reflected by a target object to the receiving module. The anti-vibration module comprises at least a processor, having a first anti-vibration procedure and a second anti-vibration procedure. In a first distance measurement mode, the processor instructs the transmitting module and the receiving module to execute the first anti-vibration procedure to obtain a distance measurement result. In a second distance measurement mode, the processor instructs the transmitting module and the receiving module to execute the second anti-vibration procedure to obtain the distance measurement result.

In some embodiments, when the first distance measurement mode is executed, the processor electrically connects the anti-vibration module, wherein a maximum movement compensation amount which is executed by the first anti-vibration procedure of the anti-vibration module is a first value, and the processor performs a movement compensation calculation according to a first displacement amount of the apparatus, so that the anti-vibration module has the first maximum movement compensation amount, and obtains a first distance measurement result. When the second distance measurement mode is executed, the processor electrically connects the anti-vibration module, wherein the maximum movement compensation amount which is executed by the second anti-vibration procedure of the anti-vibration module is a second value, and the processor performs the movement compensation calculation according to a second displacement amount of the apparatus, so that the anti-vibration module has the second maximum movement compensation amount.

In some embodiments, wherein the first value is greater than the second value, and the apparatus obtains candidate distances corresponding to a plurality of candidate target objects, and selects one of the candidate distances as the second distance measurement result.

In some embodiments, the processor determines whether a displacement amount of the apparatus is greater than a preset value, thus to determine whether to execute the first distance measurement mode or the second distance measurement mode, wherein the first distance measurement mode is executed when the displacement amount of the apparatus is not greater than the preset value, the second distance measurement mode is executed when the displacement amount of the apparatus is greater than the preset value.

In some embodiments, the second maximum movement compensation amount is close to zero.

In some embodiments, the apparatus further comprises a mode switch module for switching between the first distance measurement mode and the second distance measurement mode.

In some embodiments, when the second distance measurement mode is executed, the processor electrically connects the anti-vibration module, in which the anti-vibration module has the second maximum movement compensation amount, and the apparatus moves a second displacement amount to perform the movement compensation calculation, so that the anti-vibration module has the second maximum movement compensation amount.

In some embodiments, the apparatus obtains candidate distances corresponding to a plurality of candidate target objects, wherein the mode switch module further sets to select one of the candidate distances as the second distance measurement result.

In some embodiments, the smallest one of the candidate distances is selected as the second distance measurement result.

Methods for detecting distance may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 2:
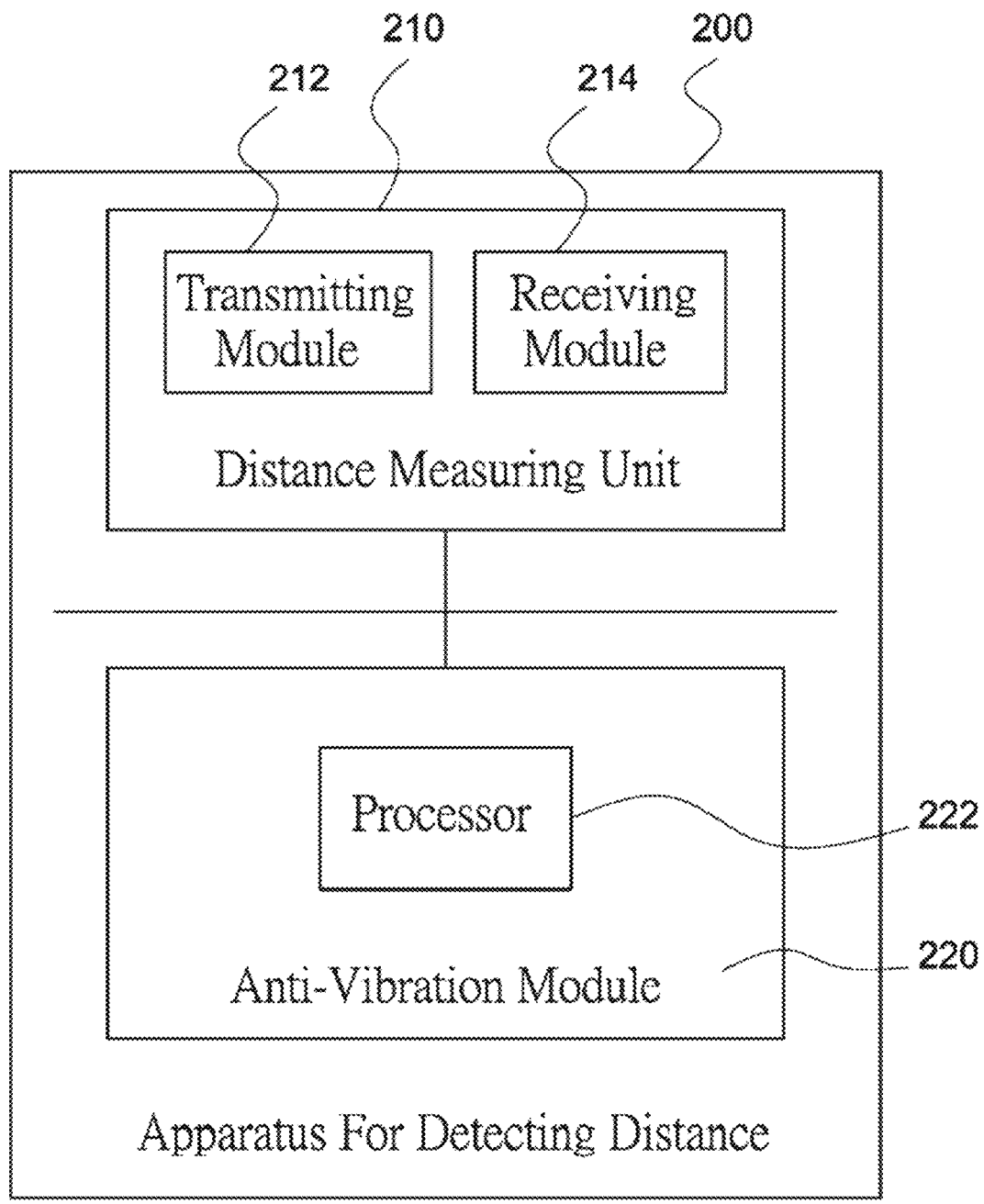
FIG. 2 is a schematic diagram illustrating an embodiment of an apparatus for detecting distance of the invention.

FIG. 2 is a schematic diagram illustrating an embodiment of an apparatus for detecting distance of the invention. It is noted that, the apparatus for detecting distance according to the embodiment of the invention can be an apparatus having a distance measurement capability, such as a rangefinder, sighting device, 2D or 3D scanner, or a LiDAR. The apparatus has an anti-vibration function. It is understood that, the above apparatuses are only examples, and the present invention is not limited thereto.

As shown in FIG. 2, the apparatus for detecting distance 200 comprises at least a distance measuring unit 210 and an anti-vibration module 220. The distance measuring unit 210 comprises at least a transmitting module 212 and a receiving module 214. The transmitting module 212 can emit a measuring beam, and the measuring beam is reflected by a target object to the receiving module 214. The anti-vibration module 220 comprises at least a processor 222. The anti-vibration module 220 is used to execute a first anti-vibration procedure or a second anti-vibration procedure. The processor 222 electrically connects the anti-vibration module 220, and uses the transmitting module 212 and the receiving module 214 to perform the first anti-vibration procedure, thus to obtain a first distance measurement result in a first distance measurement mode, wherein in the first distance measurement mode, the maximum movement compensation amount of the anti-vibration module 220 is a first value. The processor 222 electrically connects the anti-vibration module 220, and uses the transmitting module 212 and the receiving module 214 to perform a second anti-vibration procedure, thus to obtain a second distance measurement result in a second distance measurement mode, wherein in the second distance measurement mode, the maximum movement compensation amount of the anti-vibration module 220 is a second value. It is noted that, the first value is greater than the second value. The processor 222 can manage related operations of the hardware and software in the apparatus for detecting distance 200 and execute the methods for detecting distance of the invention, which will be discussed later.

It is noted that, the operating mode of the apparatus for detecting distance 200 may have a first distance measurement mode and a second distance measurement mode. Generally, the apparatus for detecting distance 200 executes the first distance measurement mode, and the second distance measurement mode is executed when the apparatus for detecting distance 200 meets certain conditions.

Figure 3:
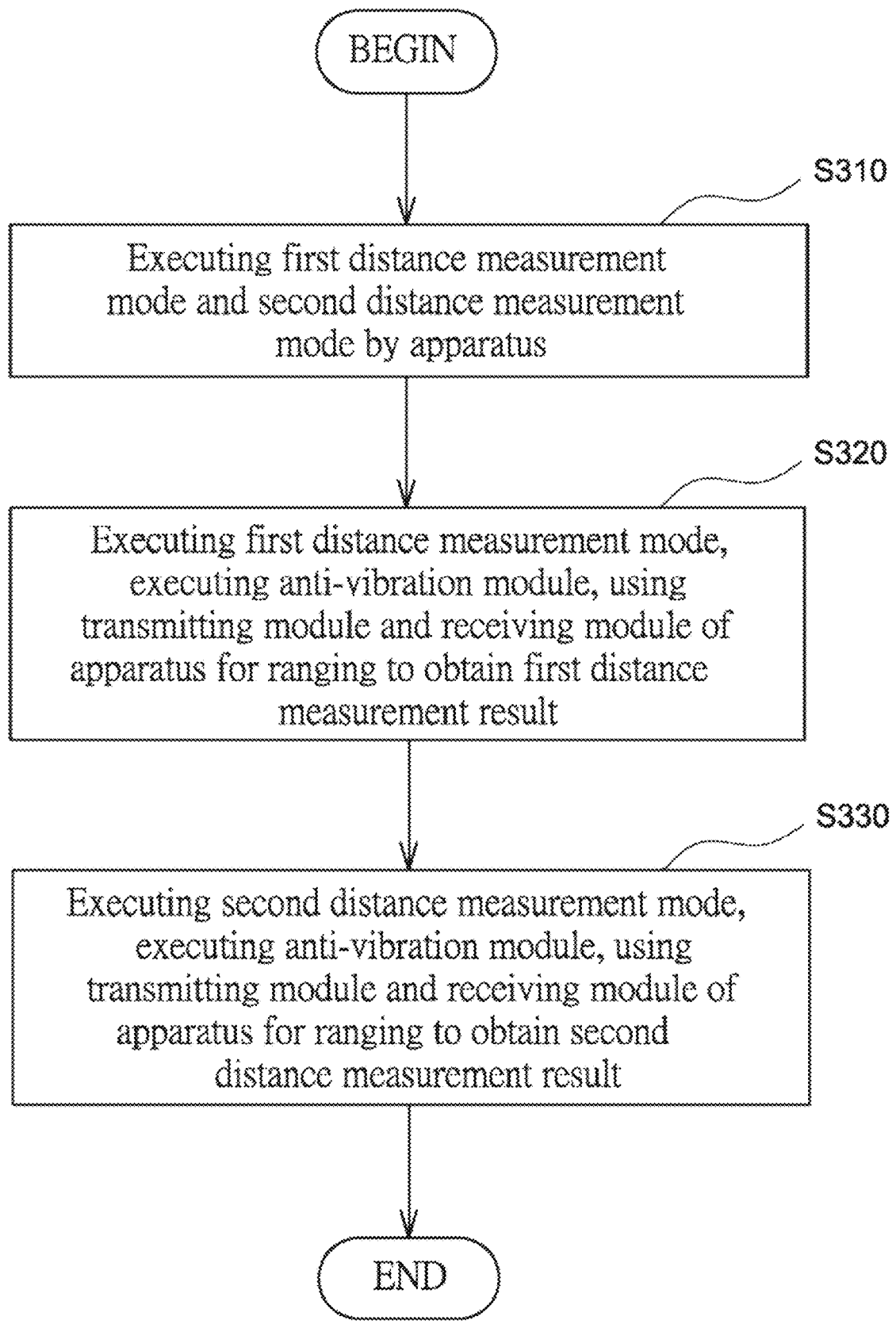
FIG. 3 is a flowchart of an embodiment of a method for detecting distance of the invention.

FIG. 3 is a flowchart of an embodiment of a method for detecting distance of the invention. The method for detecting distance of the invention can be used in the apparatus for detecting distance, such as a rangefinder, sighting device, 2D or 3D scanner, or a LiDAR in FIG. 2.

In step S310, the apparatus for detecting distance is used to execute a first distance measurement mode and a second distance measurement mode. It is reminded that the apparatus for detecting distance has an anti-vibration module. In step S320, the first distance measurement mode is executed, the anti-vibration module is executed, and the transmitting module and the receiving module of the apparatus for detecting distance are used for ranging to obtain a first distance measurement result. Then, in step S330, the second distance measurement mode is executed, the anti-vibration module is executed, and the transmitting module and the receiving module of the rangefinder are used for ranging to obtain a second distance measurement result. It is understood that, in the first distance measurement mode, the maximum movement compensation amount of the anti-vibration module is the first value. In the second distance measurement mode, the maximum movement compensation amount of the anti-vibration module is the second value, wherein the first value is greater than the second value. It is noted that, in the first distance measurement mode, the transmitting module and the receiving module are used to execute a first anti-vibration procedure to obtain the result. In the second distance measurement mode, the transmitting module and the receiving module are used to execute the second anti-vibration procedure to lock the anti-vibration module, thus to limit the amount of movement compensation, and to obtain the result.

Figure 4:
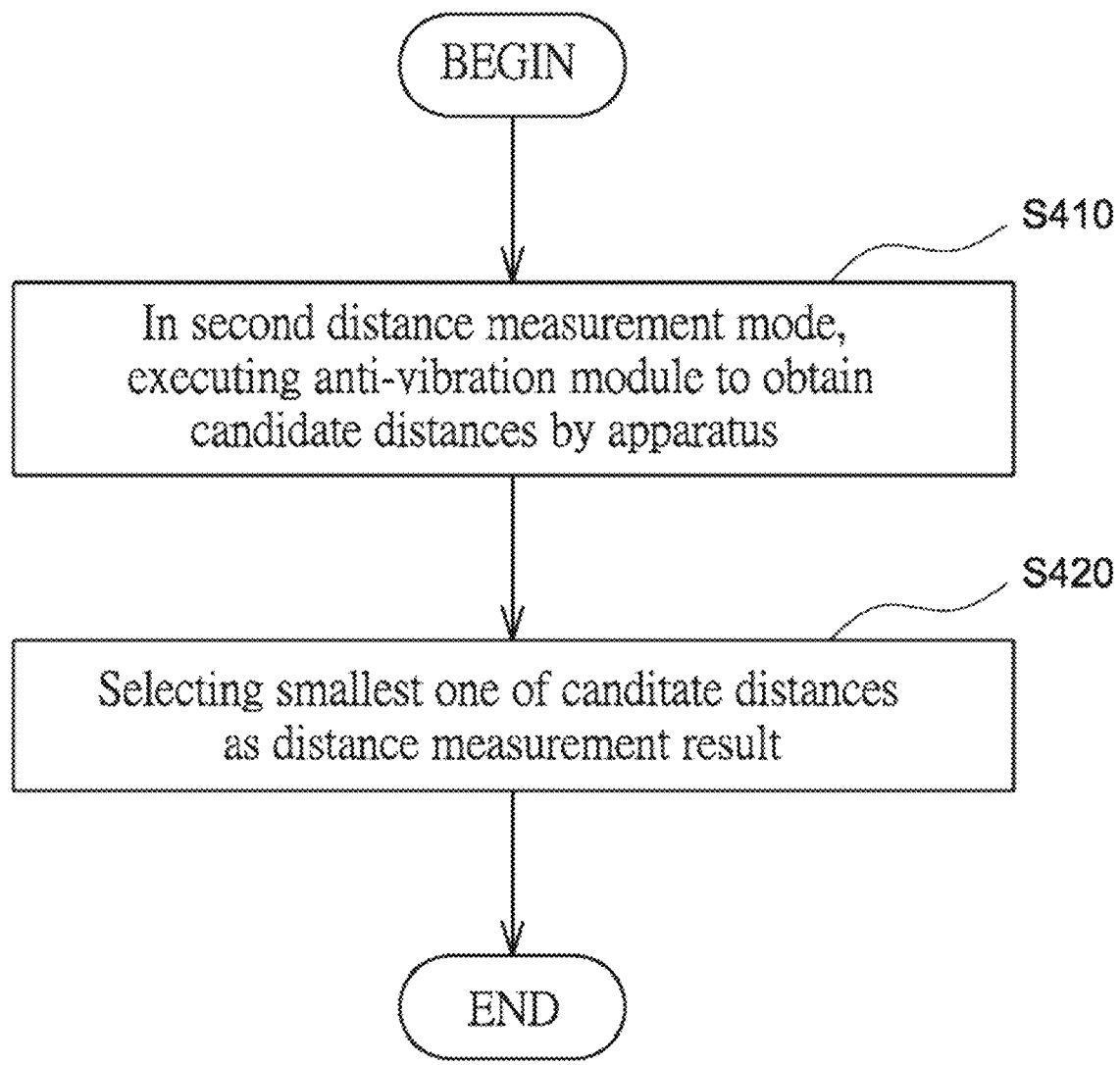
FIG. 4 is a flowchart of an embodiment of a method of determining the result of a distance measurement operation of the invention.

FIG. 4 is a flowchart of an embodiment of a method of determining the result of a distance measurement operation of the invention. In the embodiment, the distance measurement result will be determined based on the distance detected in the distance measurement procedures.

In step S410, in the second distance measurement mode, the anti-vibration module is executed, so that the apparatus for detecting distance for detecting distance, such as a rangefinder obtains candidate distances corresponding to a plurality of candidate target objects. It is reminded that, since the apparatus for detecting distance moves back and forth, the apparatus for detecting distance can obtain several results (candidate distances). Then, one of the candidate distances is selected as the second distance measurement result. In one of the embodiments, in step S420, the smallest one of the candidate distances is selected as the distance measurement result for the distance measurement operation.

When the candidate distance with the smallest distance is selected as the second distance measurement result, the measurement environment may be a complicated background behind the target object. For example, when measuring the distance of a flagpole on a golf course, the back of the flagpole is forest. In some embodiments, if there are multiple obstacles in front of the target, the candidate distance with the largest distance may be selected as the second distance measurement result, or the candidate distance with the largest signal response may be selected as the second distance measurement result. Therefore, one of the candidate distances can be selected as the distance measurement result for the corresponding distance measurement operation according to the site environment and requirements. It is noted that, in addition to the second measurement mode, in the first measurement mode, one of the candidate distances can also be selected as the distance measurement result for the corresponding distance measurement operation.

Figure 5:
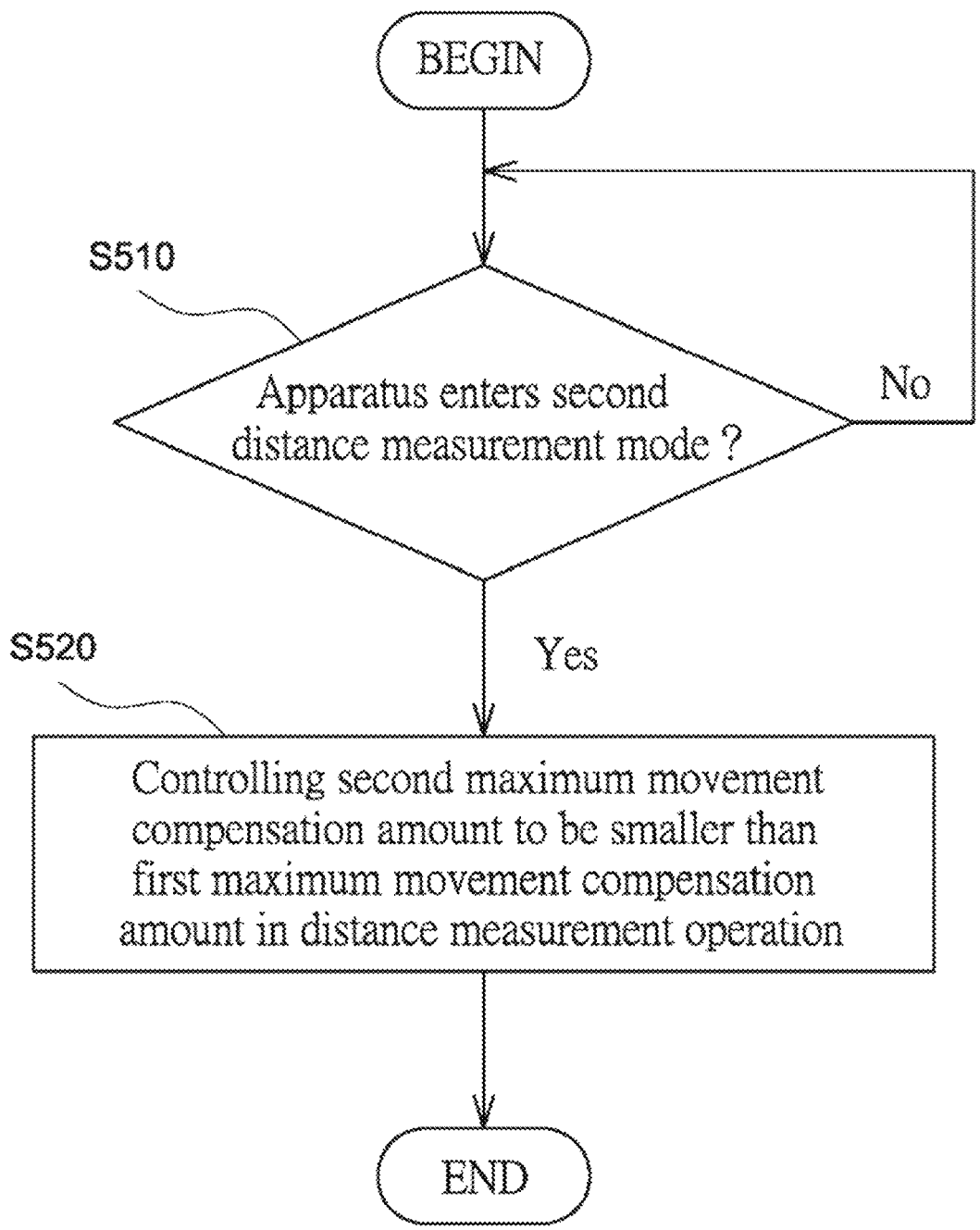
FIG. 5 is a flowchart of another embodiment of a method for detecting distance of the invention.

FIG. 5 is a flowchart of another embodiment of a method for detecting distance of the invention. In the embodiment, when the apparatus for detecting distance, such as a rangefinder, sighting device, 2D or 3D scanner, or a LiDAR moves back and forth into the second distance measurement mode for distance measurement, the anti-vibration module will still be executed, wherein the second maximum movement compensation amount is close to zero, making the anti-vibration module seems to be locked. Alternatively, the anti-vibration module can also be turned off directly, and then the second maximum movement compensation amount is equal to zero. It is noted that, in the embodiment, the operations of the apparatus for detecting distance in the second distance measurement mode is disclosed.

First, in step S510, it is determined whether the apparatus for detecting distance enters the second distance measurement mode. When the apparatus for detecting distance does not enter the second distance measurement mode (No in step S510), the procedure remains at step S510. When the apparatus for detecting distance enters the second distance measurement mode (Yes in step S510), in step S520, the second maximum movement compensation amount of the anti-vibration module is controlled to be smaller than the first maximum movement compensation amount in the distance measurement operation.

Figure 6:
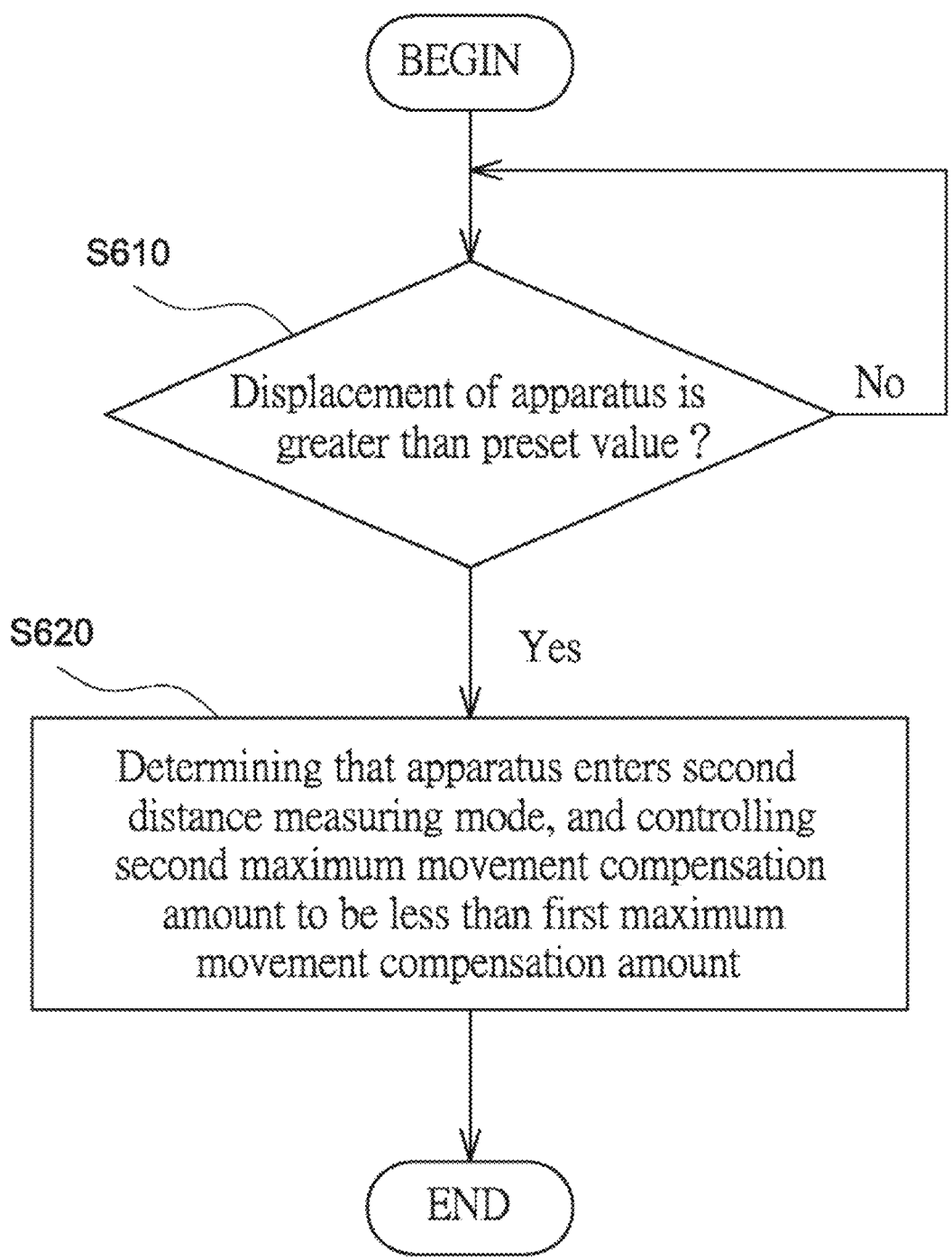
FIG. 6 is a flowchart of another embodiment of a method for detecting distance of the invention.

FIG. 6 is a flowchart of another embodiment of a method for detecting distance of the invention. In the embodiment, the apparatus for detecting distance, such as a rangefinder, sighting device, 2D or 3D scanner, or a LiDAR can automatically determine whether to enter the second distance measurement mode, and then start to control the second maximum movement compensation amount of the anti-vibration module. It is noted that, the embodiment is used to disclose how to determine that the apparatus for detecting distance should execute the second distance measurement mode.

First, in step S610, it is determined whether the displacement of the apparatus for detecting distance is greater than a preset value. When the displacement of the apparatus for detecting distance is not greater than the preset value (No in step S610), the procedure remains at step S610. When the displacement of the apparatus for detecting distance is greater than the preset value (Yes in step S610), in step S620, it is determined that the apparatus for detecting distance enters the second distance measurement mode, and the second maximum movement compensation amount of the anti-vibration module is controlled to be less than the first maximum movement compensation amount. It is understood that, when the apparatus for detecting distance does not enter the second distance measurement mode, the apparatus for detecting distance will continue to be in the first distance measurement mode and continue related judgments.

It is understood that, in some embodiments, the apparatus for detecting distance may provide a mode switching module, where the mode switching module may be a menu or control key for users to choose the first distance measurement mode or the second distance measurement mode for execution, so that the control operation of the second maximum movement compensation amount of the anti-vibration module can be manually executed during the distance measurement operation. It is noted that, the mode switching module further includes the option of setting one of the candidate distances as the second distance measurement result, wherein the minimum distance, the maximum distance, or the distance with the largest signal response can be selected as the distance measurement result according to the site situations and requirements.

On the other hand, in some embodiments, in order to solve the problem of image jitter when the anti-vibration module is turned off. When the anti-vibration module is turned off, an image rendering process can be performed on the image captured by the apparatus for detecting distance to smoothly display the image on the viewing windows of the rangefinder (not shown in FIG. 2).

Figure 1:
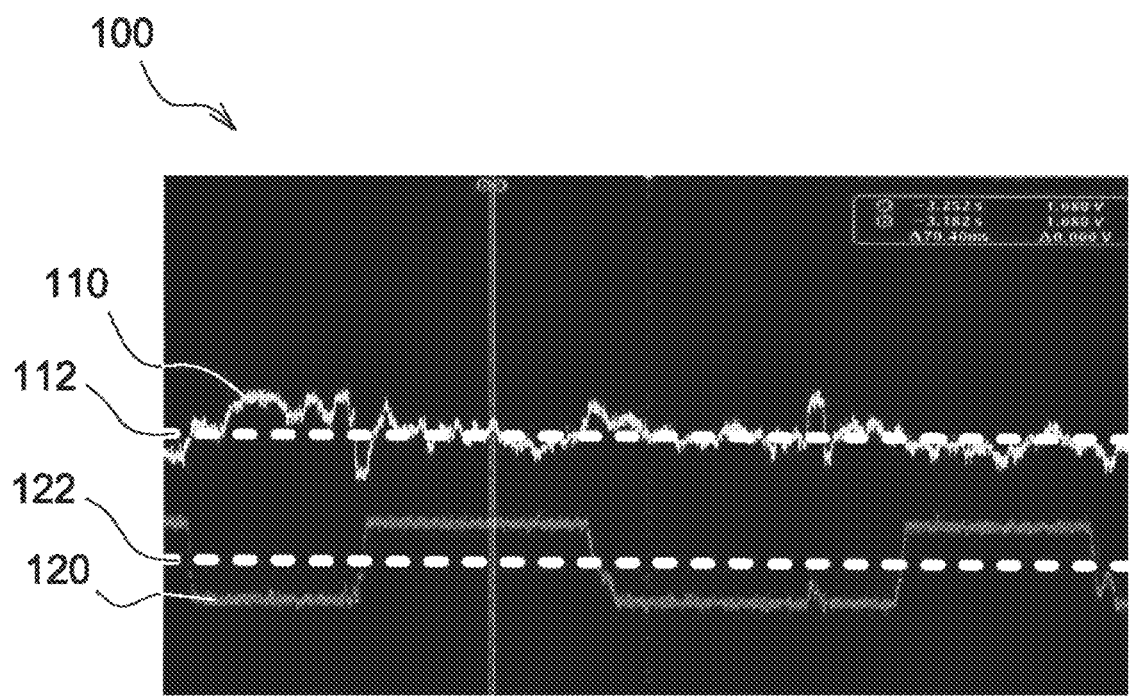
FIG. 1 shows the signal results obtained by the laser rangefinder when the rangefinder moves back and forth under the conventional technology.
Figure 7:
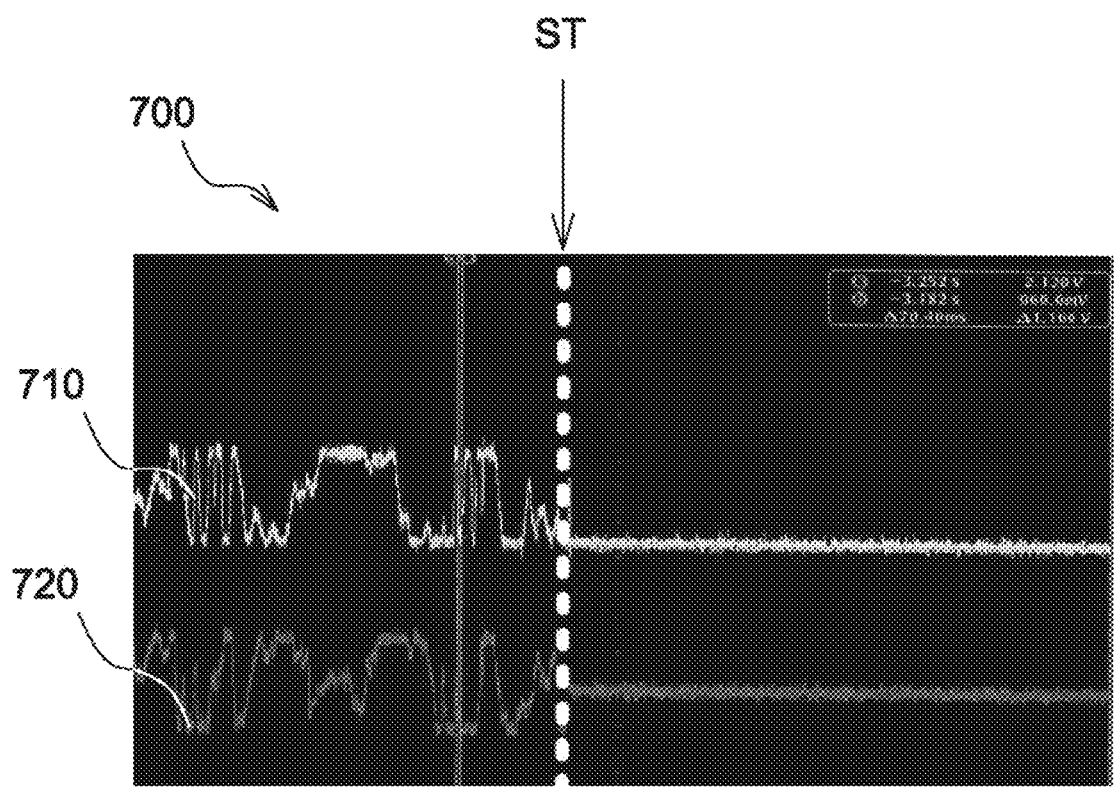
FIG. 7 shows the signal results of a distance measurement operation implemented according to the method for detecting distance of the invention.

FIG. 7 shows the signal results of a distance measurement operation implemented according to the method for detecting distance of the invention. In the distance measurement operation, when the apparatus for detecting distance enters the second distance measurement mode, the anti-vibration module is turned off at time ST, or the anti-vibration module is turned on, but the second maximum movement compensation amount is controlled to be close to zero. At this time, the signal results 700 obtained by the apparatus for detecting distance is shown in FIG. 7, in which the ordinate in the FIG. 7 is the voltage value (V), the abscissa in the FIG. 7 is the time (T), and the greater the amplitude of the voltage value (V), the greater the movement compensation amount of the anti-vibration module. As shown in FIG. 7, after the anti-vibration module is turned off or the second maximum movement compensation amount is close to zero, the vertical movement signal 710 and the horizontal movement signal 720 will be approximately static to stabilize the emitted laser beam axis. If the apparatus for detecting distance is moving back and forth in the horizontal direction (or called target scanning), the horizontal movement signal 720 will be roughly static, while the vertical movement signal 710 will still have normal compensation which is similar to the vertical movement signal 110 in FIG. 1.

Figure 8:
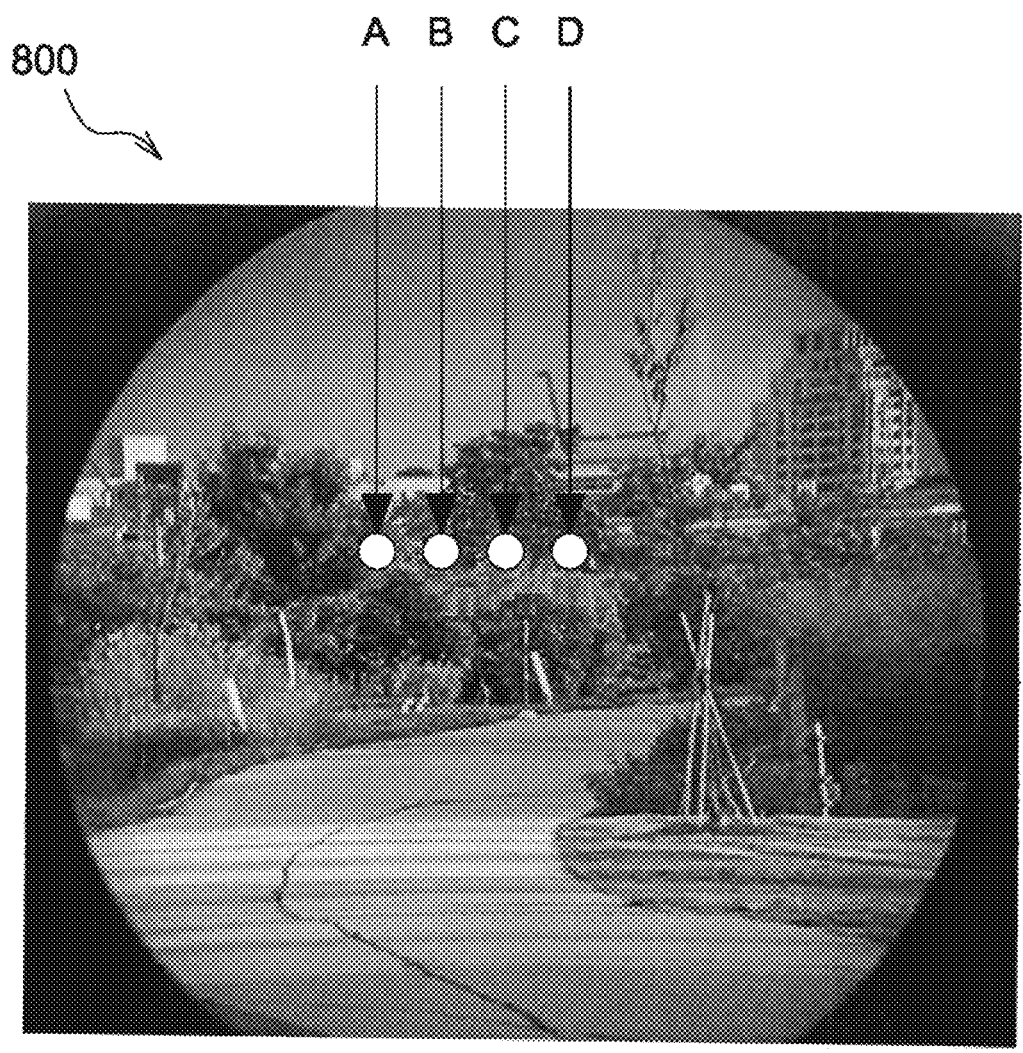
FIG. 8 shows an example of distance detection by an apparatus for detecting distance.

FIG. 8 shows an example of distance detection by an apparatus for detecting distance. In this example, the user can move the apparatus for detecting distance back and forth between scanning points A, B, C, and D in the viewfinder screen 800, and the apparatus for detecting distance can obtain the candidate distances of the corresponding candidate targets. It is reminded that due to the movement of the apparatus for detecting distance, the apparatus for detecting distance can obtain multiple results (candidate distances). After that, in step S420, the smallest one of these candidate distances is selected as the distance measurement result for the corresponding distance measurement operation.

Therefore, the apparatuses for detecting distance and methods thereof of the invention can perform distance measurement in an anti-vibration rangefinder. The technology of the present invention can turn off the anti-vibration compensation when dynamically scanning the environment, and control the second maximum motion compensation amount to be close to zero, or control the second maximum motion compensation amount to be smaller than the first maximum motion compensation amount, such that the position of the laser light emission is consistent with that of the hand movement in the second distance measurement mode, thus easily and accurately finding the closest target, such as a golf flagpole in a background environment with multiple objects, such as woods. It is understood that, the target and background environment are only examples, and the invention is not limited thereto.

Methods for detecting distance, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for detecting distance for use in an apparatus configured to measuring a distance, comprising:
    executing a first distance measurement mode by using the apparatus, wherein the apparatus has an anti-vibration module;
    executing a second distance measurement mode by using the apparatus when displacement of the apparatus is greater than a preset value;
    when the first distance measurement mode is executed, electrically connecting the anti-vibration module to perform distance measurement to obtain a first distance measurement result, wherein the maximum movement compensation amount of the anti-vibration module is a first value; and
    when the second distance measurement mode is executed, electrically connecting the anti-vibration module to perform distance measurement to obtain a second distance measurement result, wherein the maximum movement compensation amount of the anti-vibration module is a second value, and the first value is greater than the second value.

2. The method of claim 1, further comprising:
    when the first distance measurement mode is executed, electrically connecting the anti-vibration module by the apparatus to perform a movement compensation calculation according to a first displacement amount of the apparatus, so that the anti-vibration module has the first maximum movement compensation amount, and obtains the first distance measurement result;

when the second distance measurement mode is executed, electrically connecting the anti-vibration module by the apparatus to perform the movement compensation calculation according to a second displacement amount of the apparatus, so that the anti-vibration module has the second maximum movement compensation amount, and the apparatus obtains candidate distances corresponding to a plurality of candidate target objects; and
selecting one of the candidate distances as the second distance measurement result.

3. The method of claim 2, wherein the smallest one of the candidate distances is selected as the second distance measurement result.

4. The method of claim 1, further comprising a step of providing a mode switch module for switching between the first distance measurement mode and the second distance measurement mode.

5. The method of claim 4, further comprising:
when the second distance measurement mode is executed, electrically connecting the anti-vibration module by a processor, and the apparatus moving a second displacement amount to perform the movement compensation calculation, so that the anti-vibration module has the second maximum movement compensation amount, and the apparatus obtains candidate distances corresponding to a plurality of candidate target objects,
wherein the mode switch module further sets to select one of the candidate distances as the second distance measurement result.

6. The method of claim 5, wherein the smallest one of the candidate distances is selected as the second distance measurement result.

7. The method of claim 1, further comprising:
determining whether the apparatus enters the second distance measurement mode; and
when the apparatus enters the second distance measurement mode, electrically connecting the anti-vibration module in the second distance measurement mode, and instructing the anti-vibration module to perform a movement compensation based on the second maximum movement compensation amount.

8. The method of claim 7, wherein the second maximum movement compensation amount is close to zero.

9. The method of claim 7, further comprising:
determining whether a displacement amount of the apparatus is greater than a preset value, thus to determine whether to execute the first distance measurement mode or the second distance measurement mode;
when the displacement amount of the apparatus is not greater than the preset value, determining the first distance measurement mode to be executed; and
when the displacement amount of the apparatus is greater than the preset value, determining the second distance measurement mode to be executed.

10. An apparatus, comprising:
a distance measurement unit comprising at least a transmitting module and a receiving module, wherein the transmitting module emits a measuring beam, and the measuring beam is reflected by a target object to the receiving module; and
an anti-vibration module comprising at least a processor, having a first anti-vibration procedure and a second anti-vibration procedure, in a first distance measurement mode, instructing the transmitting module and the receiving module to execute the first anti-vibration procedure to obtain a first distance measurement result, and in a second distance measurement mode which is executed when displacement of the apparatus is greater than a preset value, instructing the transmitting module and the receiving module to execute the second anti-vibration procedure to obtain a second distance measurement result.

11. The apparatus of claim 10, wherein when the first distance measurement mode is executed, the processor electrically connects the anti-vibration module, wherein a maximum movement compensation amount which is executed by the first anti-vibration procedure of the anti-vibration module is a first value, and the processor performs a movement compensation calculation according to a first displacement amount of the apparatus, so that the anti-vibration module has the first maximum movement compensation amount, and obtains a first distance measurement result, and when the second distance measurement mode is executed, the processor electrically connects the anti-vibration module, wherein the maximum movement compensation amount which is executed by the second anti-vibration procedure of the anti-vibration module is a second value, and the processor performs the movement compensation calculation according to a second displacement amount of the apparatus, so that the anti-vibration module has the second maximum movement compensation amount.

12. The apparatus of claim 11, wherein the first value is greater than the second value, and the apparatus obtains candidate distances corresponding to a plurality of candidate target objects, and selects one of the candidate distances as the second distance measurement result.

13. The apparatus of claim 12, wherein the smallest one of the candidate distances is selected as the second distance measurement result.

14. The apparatus of claim 12, wherein the processor determines whether a displacement amount of the apparatus is greater than a preset value, thus to determine whether to execute the first distance measurement mode or the second distance measurement mode, wherein the first distance measurement mode is executed when the displacement amount of the apparatus is not greater than the preset value, the second distance measurement mode is executed when the displacement amount of the apparatus is greater than the preset value.

15. The apparatus of claim 12, wherein the second maximum movement compensation amount is close to zero.

16. The apparatus of claim 10, further comprising a mode switch module for switching between the first distance measurement mode and the second distance measurement mode.

17. The apparatus of claim 16, wherein when the second distance measurement mode is executed, the processor electrically connects the anti-vibration module, in which the anti-vibration module has the second maximum movement compensation amount, and the apparatus moves a second displacement amount to perform the movement compensation calculation, so that the anti-vibration module has the second maximum movement compensation amount, and the apparatus obtains candidate distances corresponding to a plurality of candidate target objects, wherein the mode switch module further sets to select one of the candidate distances as the second distance measurement result.

18. The apparatus of claim 17, wherein the smallest one of the candidate distances is selected as the second distance measurement result.

* * * * *